(12) United States Patent
Liu

(10) Patent No.: US 7,720,117 B2
(45) Date of Patent: May 18, 2010

(54) FAST CONTINUOUSLY WAVELENGTH TUNING SINGLE FREQUENCY FIBER LASER USING TUNABLE POLYMER OPTICAL FILTERS

(76) Inventor: Jian Liu, 1773 Karameos Ct., Sunnyvale, CA (US) 94087

( * ) Notice: Subject to any disclaimer, the term of this patent is extended or adjusted under 35 U.S.C. 154(b) by 109 days.

(21) Appl. No.: 12/209,873

(22) Filed: Sep. 12, 2008

(65) Prior Publication Data

US 2009/0041066 A1    Feb. 12, 2009

Related U.S. Application Data

(63) Continuation of application No. 10/966,638, filed on Oct. 14, 2004, now Pat. No. 7,466,726.

(60) Provisional application No. 60/510,133, filed on Oct. 14, 2003, provisional application No. 60/511,681, filed on Oct. 17, 2003, provisional application No. 60/560,983, filed on Apr. 12, 2004.

(51) Int. Cl.
  *H01S 3/10*    (2006.01)

(52) U.S. Cl. .......................................... 372/20; 372/32
(58) Field of Classification Search .................. 372/20, 372/32, 29.021, 29.02
  See application file for complete search history.

(56) References Cited

U.S. PATENT DOCUMENTS

| 4,269,481 | A | * | 5/1981 | Yeh ............................. 359/259 |
| 5,751,758 | A | * | 5/1998 | Kuwatsuka ................... 372/96 |
| 6,330,254 | B1 | * | 12/2001 | Hung ........................... 372/20 |

* cited by examiner

*Primary Examiner*—Minsun Harvey
*Assistant Examiner*—Tuan N. Nguyen
(74) *Attorney, Agent, or Firm*—John M. Taboada

(57) ABSTRACT

A method for generating a laser projection by employing a laser gain medium for receiving an optical input projection from a laser pump. The method further includes a step of employing a mode selection filter comprising an electro-optical (EO) tunable layer disposed between two parallel reflection plates for generating a laser of a resonant peak.

18 Claims, 8 Drawing Sheets

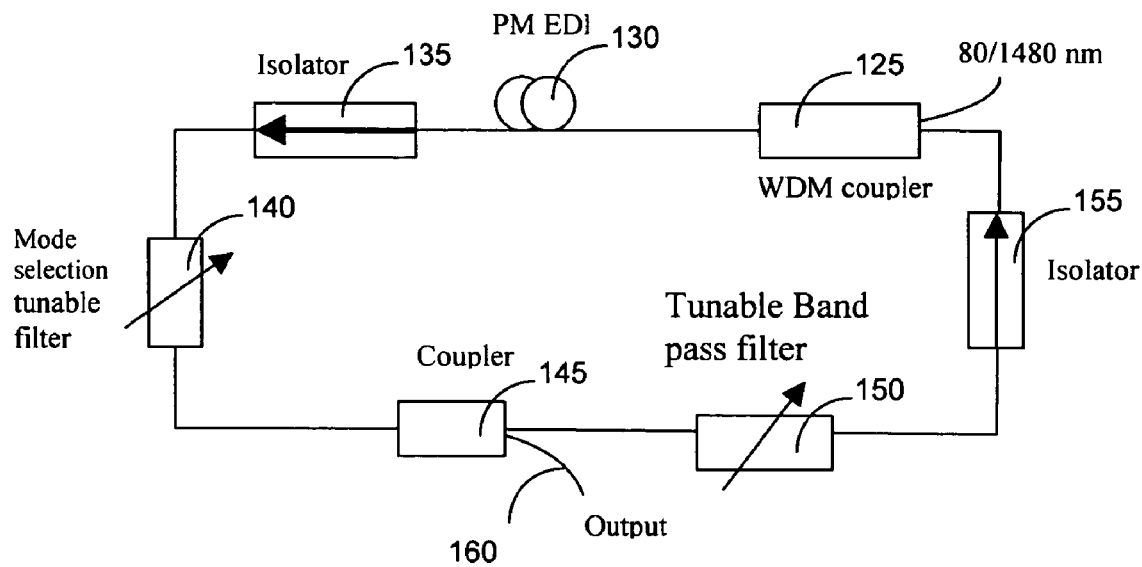
Figure 1 Tunable single frequency fiber ring laser
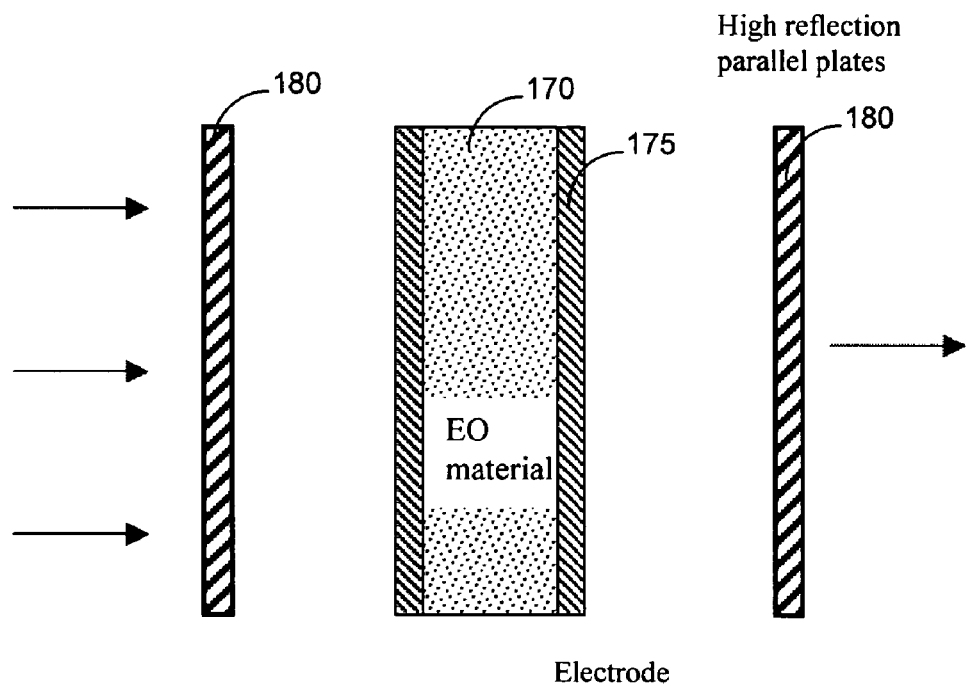
Figure 2A Fast wavelength selective switches

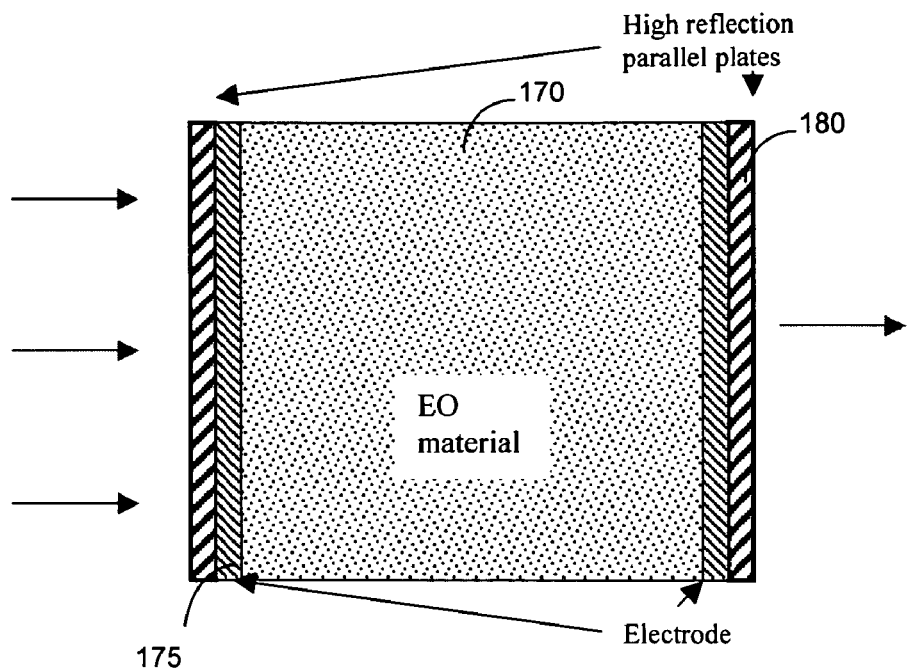
Figure 2B Fast wavelength selective switches
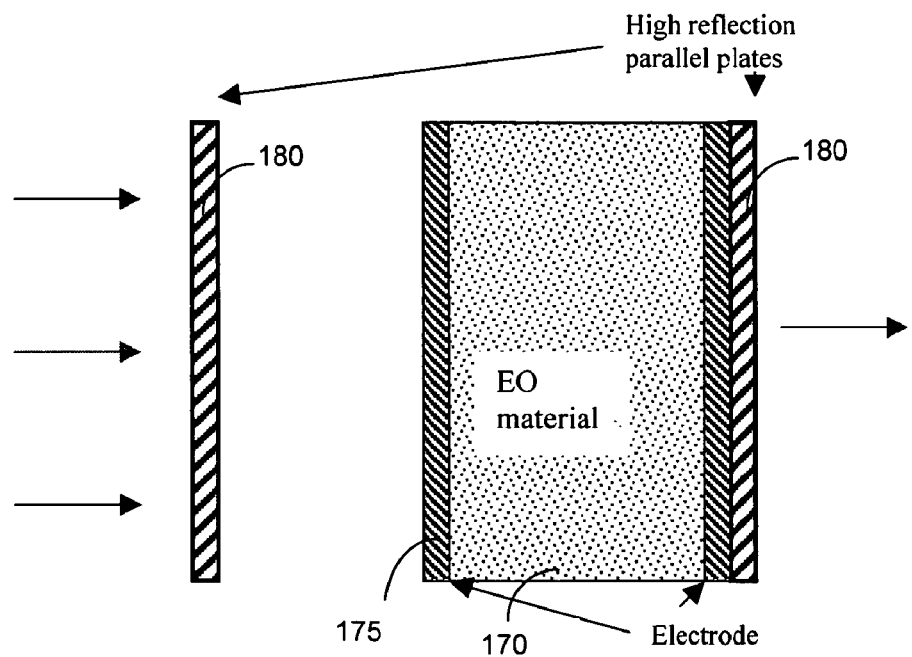
Figure 2C Fast wavelength selective switches

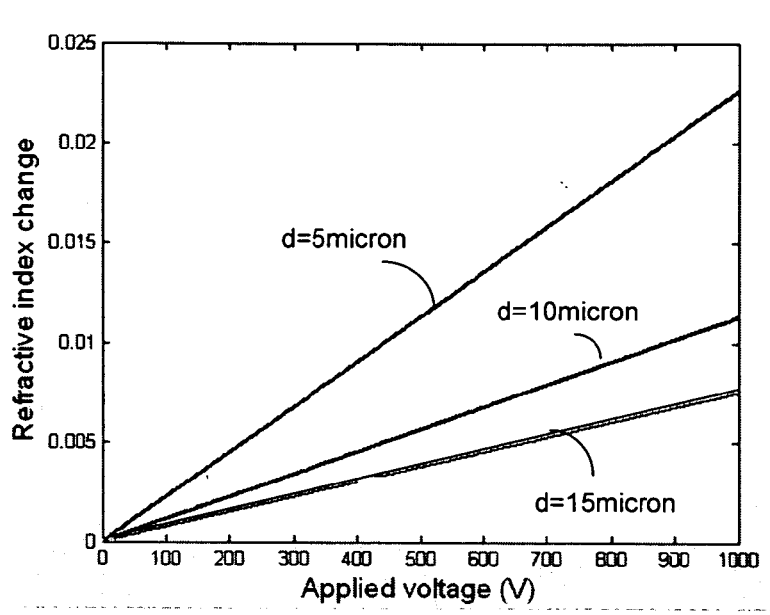
Figure 3 Refractive index change as a function of applied voltage
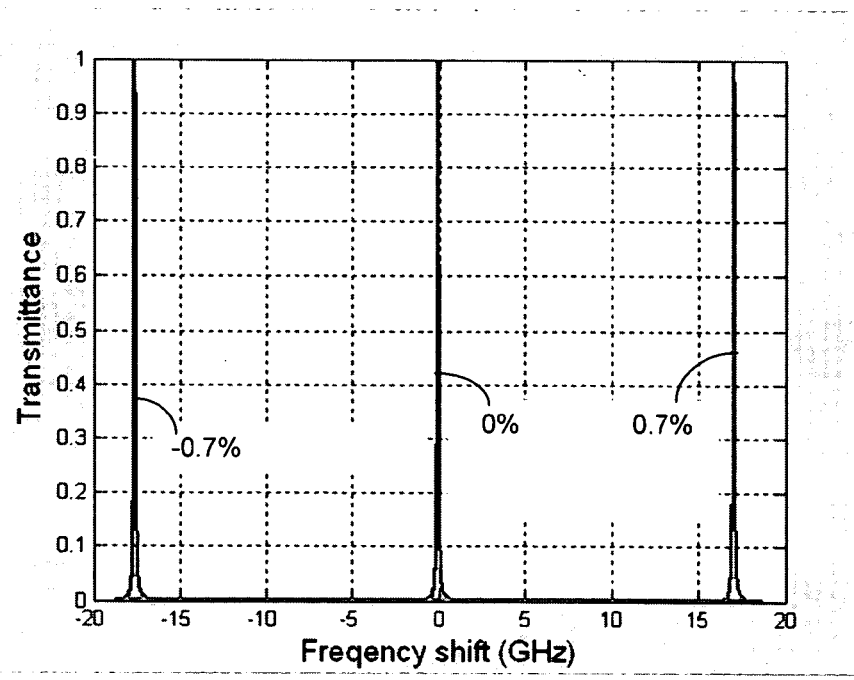
Figure 4 Wavelength tuning for 2 mm cavity filled with 5 micron EO polymer (R = 0.995)

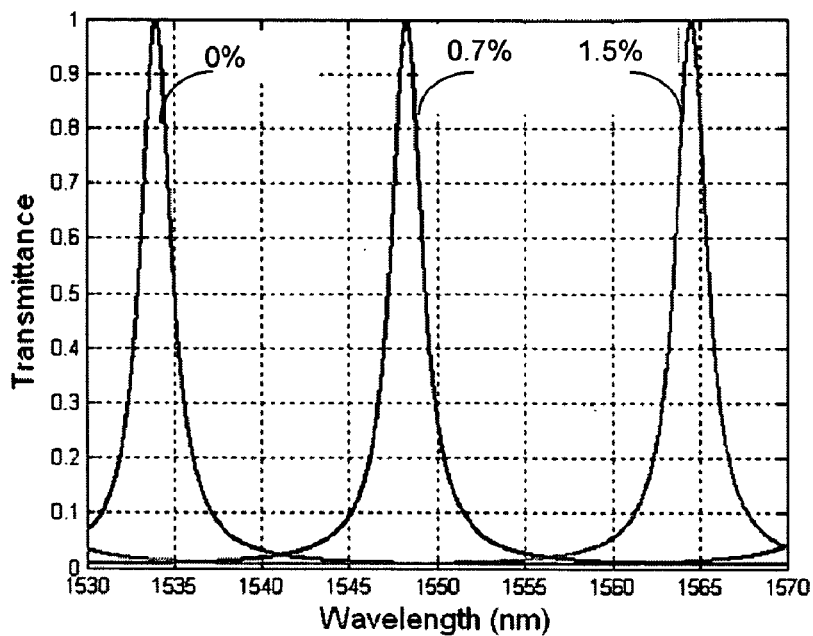
Figure 5 Wavelength tuning for 20 micron EO polymer filled cavity (R = 0.90)
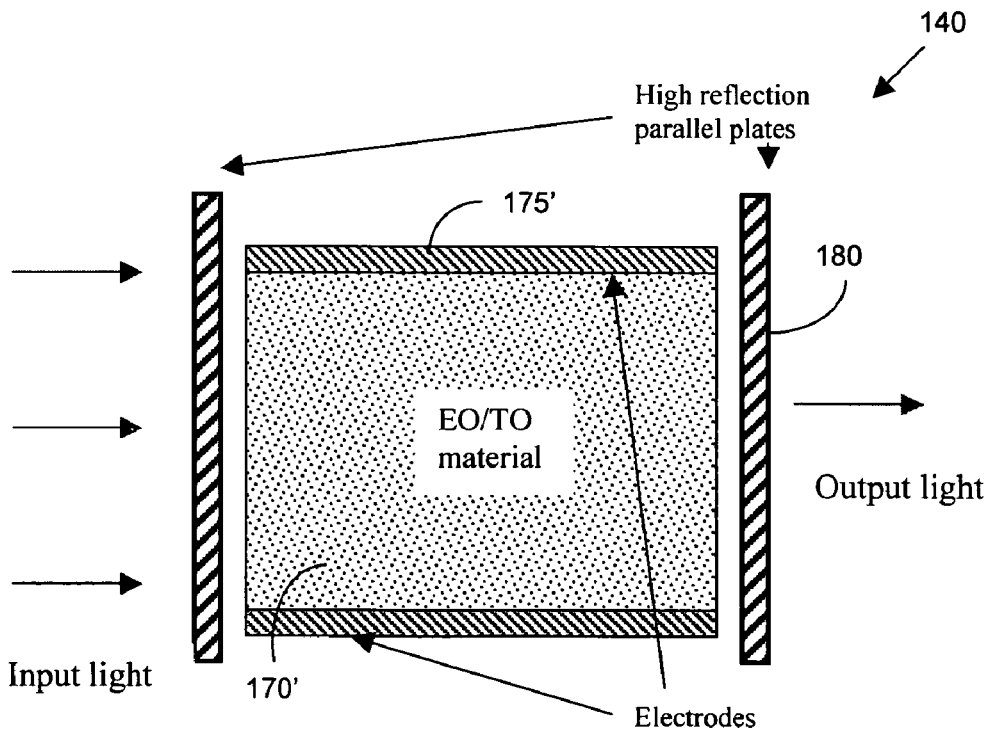
Figure 6 polymer based OTF

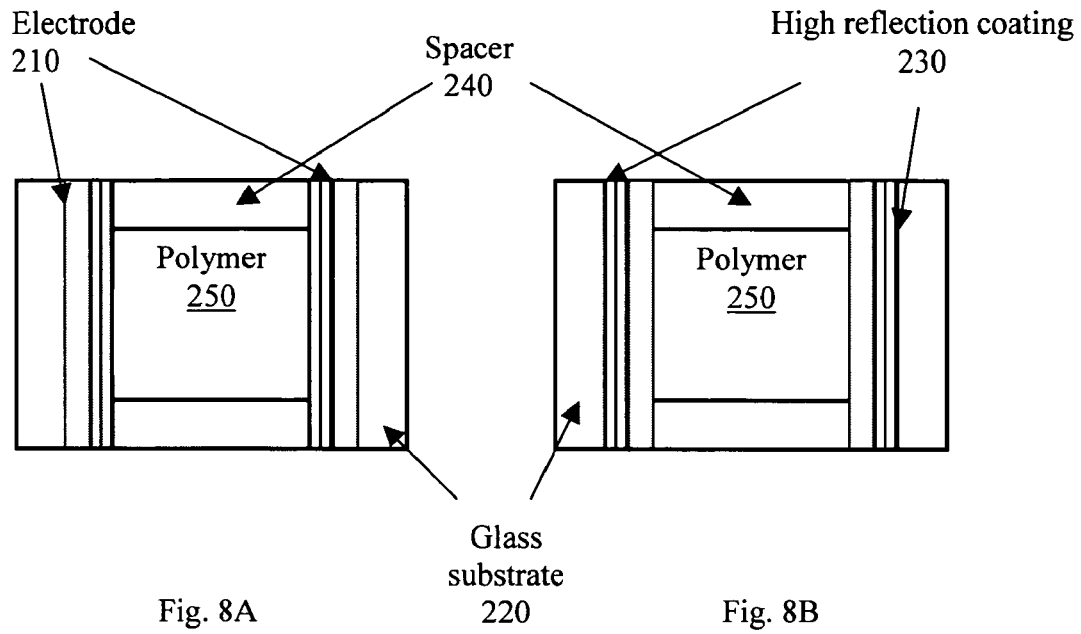
Fig. 8A
Fig. 8B
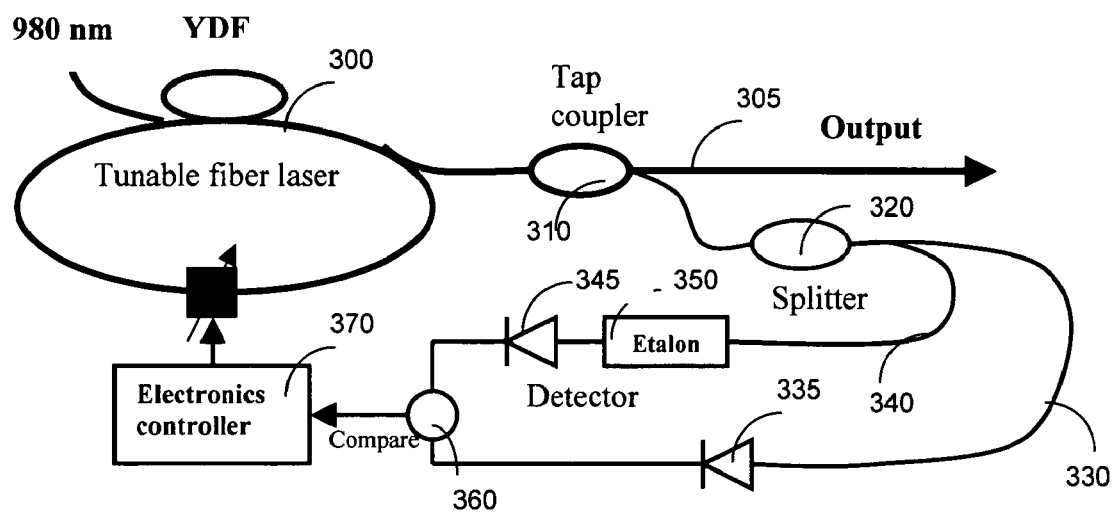
Figure 9 schematic diagram for locking the frequency and stabilizing the power of the tunable fiber laser

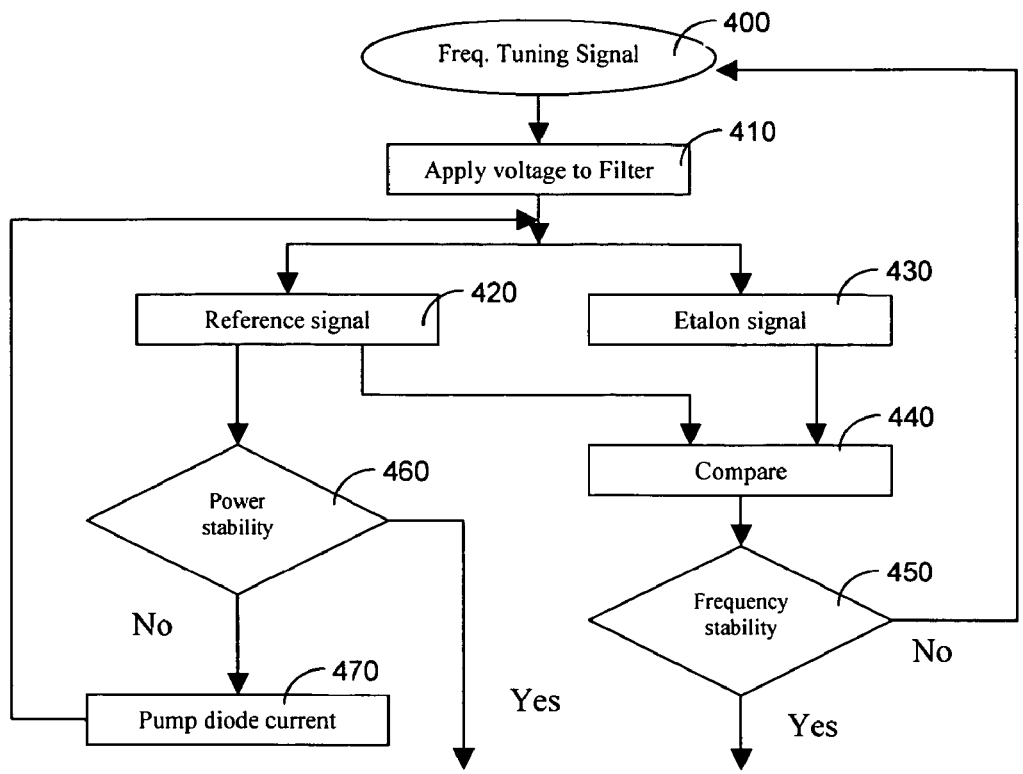
Figure 10 Tuning and locking algorithm for the proposed tunable fiber laser
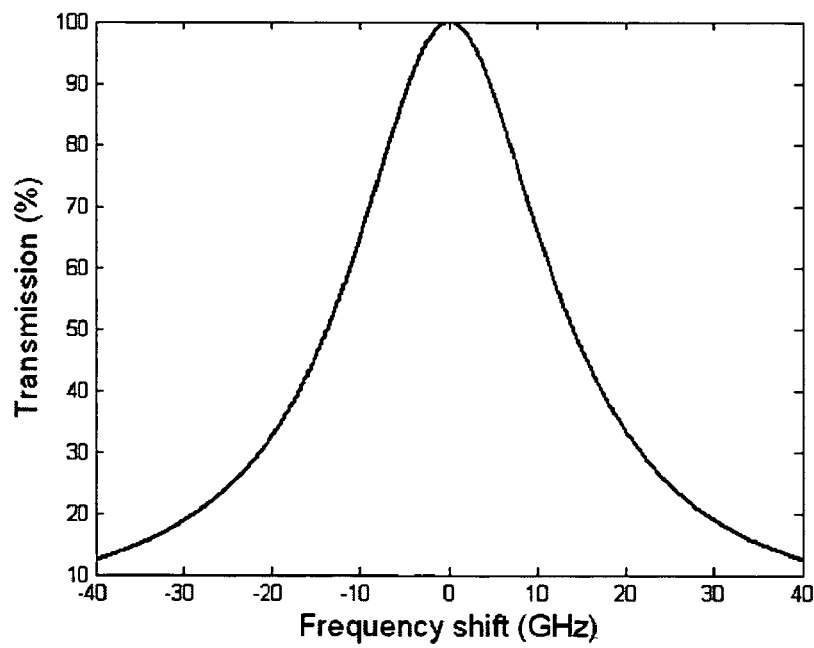
Figure 11 Transmission curve of an etalon for tuning and locking the frequency of the tunable fiber laser

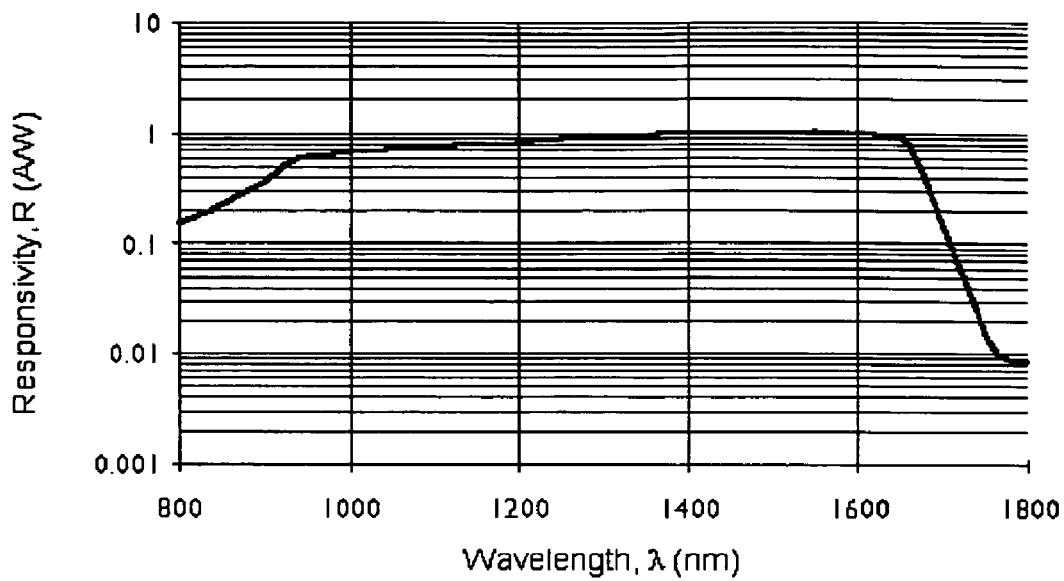
Figure 12 A typical responsivity of InGaAs photodetector
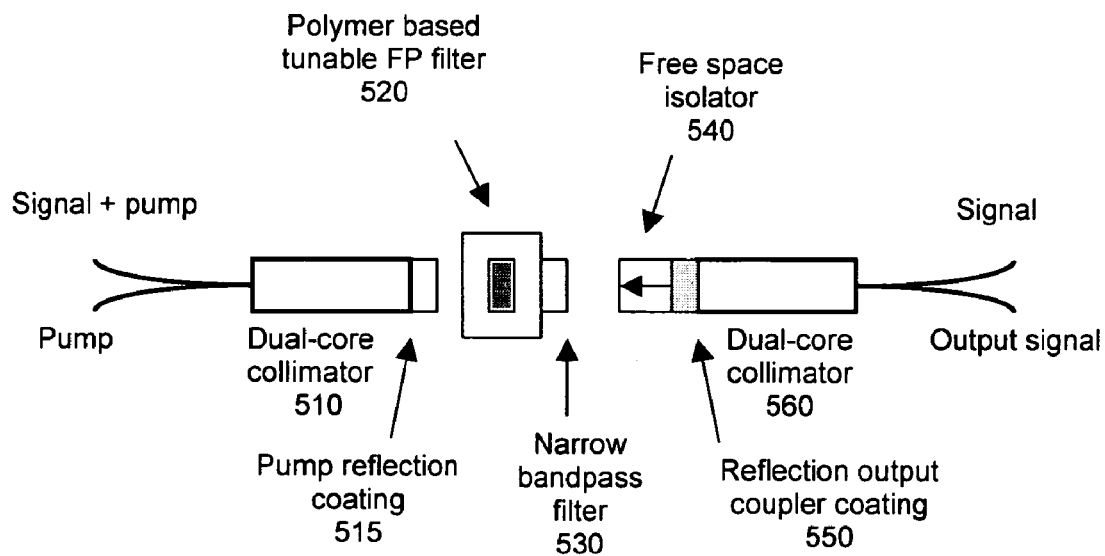
Figure 13 Integrated solution for components used in the tunable fiber laser

FAST CONTINUOUSLY WAVELENGTH TUNING SINGLE FREQUENCY FIBER LASER USING TUNABLE POLYMER OPTICAL FILTERS

The present application is a Continuation Application of and claims priority to commonly assigned U.S. patent application Ser. No. 10/966,638, titled "Fast continuously wavelength tuning single frequency fiber laser using tunable polymer optical filter", filed Oct. 14, 2004 now U.S. Pat. No. 7,466,726. U.S. patent application Ser. No. 10/966,638 further claims priority to commonly assigned Provisional Patent Application 60/510,133, filed Oct. 14, 2003, Provisional Patent Application 60/511,681, filed Oct. 17, 2003, and Provisional Patent Application 60/560,983, filed Apr. 12, 2004. Provisional Patent Application 60/510,133, The disclosures of these related applications are incorporated herein by reference.

FIELD OF THE INVENTION

The present invention relates generally to apparatuses and methods for providing single frequency laser sources. More particularly, this invention relates to new configurations and methods for providing compact single frequency fiber laser with optical sensing suitable for implementation coherent communication, laser tracking, coherent detection laser radars and instrument.

BACKGROUND OF THE INVENTION

Conventional technologies of tunable lasers are confronted with technical difficulties and limitations. Specifically, tunable lasers which are implemented with mechanical or temperature tuning to change the cavity length to tune the wavelength do not provide stable and accurate turning in terms of power and frequency. More details of such technical limitations are more fully discussed in references such as "Stress induced tuning of a diode laser excited monolithic Nd:YAG laser," by Adelbert Owyoung and Peter Asherick, in Opt. Lett. 12(12), 999-1001 (1987); and "Efficient, frequency stable laser diode pumped Nd:YAG laser," by Bingkun Zhou, T. J. Kane, G. J. Dixon, and R. L. Byer, in Opt. Lett. 10(2), 62-64 (1985).

On the other hand, different approaches using tuning grating for frequency tuning of linewidth not very narrow, acoustic optical tuning filter (AOTF), or a Fabry Perot (FP) cavity can provide stable operation. However, these tuning methods cannot provide continuous tuning and accurate access of the wavelength due to the difficulties of hysterises. More details about the discussions of the hysterises are disclosed in several references. These references are: Hidemi Tsuchida, "Tunable, narrow linewidth output from an injection locked high power AlGaAs laser diode array," Opt. Lett. 19(21), 1741-1743 (1994); Jian Liu, Stable and high speed full range laser wavelength tuning with reduced group delay and temperature variation compensation, Patent Application Number 10/337081, January 2002; and M. Auerbach, et al., "10 W widely tunable narrow linewidth double clad fiber ring laser," Optics Express 10(2), 139-144 (2002).

In the meantime, continuously frequency-tunable single frequency lasers with linewidth in the order of kHz are important to coherent optical communications, coherent laser radars, optical sensing, test and measurement, and laser tracking of flying objects. For these reasons, there are urgent demand to develop a laser system that the wavelength can be continuously tuned and randomly accessed with excellent wavelength accuracy, stability, and linewidth.

A co-pending application Ser. No. 10/337,081 filed by the Applicant of this invention is hereby incorporated by reference. In this co-pending Application, a single frequency fiber laser to provide laser output of sharp and stable highly defined frequency is disclosed. Meanwhile, there is still a need to provide further improvement on the continuously tunable single frequency lasers with fine linewidth tuning accuracy.

Therefore, a need still exists in the art of fiber laser source design and manufacture to provide a new and improved configuration and method to provide continuously frequency-tunable single frequency lasers with linewidth in the order of kHz such that the above discussed difficulty may be resolved.

SUMMARY OF THE PRESENT INVENTION

It is therefore an object of the present invention to provide a continuously frequency-tunable single frequency lasers with linewidth in the order of kHz such that the above described difficulties encountered in the prior art can be resolved.

Specifically, it is an object of this invention to provide a new ways of implementation of continuously frequency tunable filter with a high-speed electro-optical tunable filter serving as a mode selection filter to work with a bandpass filter. In a preferred embodiment, the mode selection filter includes an EO tunable polymer with electrodes to apply voltage for frequency tuning. In an alternate preferred embodiment, the electrodes applied to the polymer material are along a transverse direction. Instead of perpendicular to the direction of light propagation, the electrodes are parallel to the light propagation direction. The polymer can be EO or TO polymers. Other material having similar EO or TO properties may also apply to this invention. The positions of the polymer cells can be in the middle, filled in the FP cavity, or on one side of the cavity.

Briefly, in a preferred embodiment, the present invention discloses a single frequency fiber laser that includes a laser gain medium for receiving an optical input projection from a laser pump. The fiber laser further includes a mode selection filter comprising an electro-optical (EO) tunable layer disposed between two parallel reflection plates for generating a resonant peak. In a preferred embodiment, the mode selection filter further includes two electrodes for applying a tuning voltage to said EO tunable layer.

In essence this invention discloses fiber laser that includes a mode selection filter combining with a bandpass filter for generating a continuously tunable single frequency tunable over a specified frequency range.

In a preferred embodiment, this invention further discloses a method for generating a laser projection by employing a laser gain medium for receiving an optical input projection from a laser pump. The method further includes a step of employing a mode selection filter comprising an electro-optical (EO) tunable layer disposed between two parallel reflection plates for generating a laser of a resonant peak. In a preferred embodiment, the method further includes a step of projecting the laser of the resonant peak through a bandpass filter for generating a laser of substantially a single frequency. In another preferred embodiment, the method further includes a step of applying a tuning voltage to the EO tunable layer for tuning a frequency of the fiber laser. In another preferred embodiment, the step of employing a mode selection filter further comprising a step of disposing a LiNbO3 as the EO tunable layer between the parallel reflection plates. In another preferred embodiment, the step of employing a mode selection filter further comprising a step of disposing a semiconductor as the EO tunable layer between the parallel reflection plates. In another preferred embodiment, the step of employing a mode selection filter further comprising a step of disposing a electro-optical polymer as the EO tunable layer between the parallel reflection plates. In another preferred embodiment, the step of employing a mode selection filter further comprising a step of disposing a PLZT as the EO tunable layer between the parallel reflection plates. In another preferred embodiment, the step of employing a mode selection filter further comprising a step of disposing a KTN (KTaNbO3) as the EO tunable layer between the parallel reflection plates.

In a preferred embodiment, this invention further discloses a mode selection filter that includes an electro-optical (EO) tunable layer disposed between two parallel reflection plates for generating a resonant peak. In a preferred embodiment, the mode selection filter further includes two electrodes for applying a tuning voltage to the EO tunable layer. In another preferred embodiment, the mode selection filter further includes two electrode plates and the EO tunable layer between the parallel reflection plates disposed between the two electrode plates. In another preferred embodiment, the EO tunable layer between the parallel reflection plates filling a space between the electrode plates. In another preferred embodiment, the EO tunable layer between the parallel reflection plates occupying partially a space between the electrode plates. In another preferred embodiment, the EO tunable layer between the parallel reflection plates attached to one of the electrode plates. In another preferred embodiment, the electrodes are transparent electrodes. In another preferred embodiment, the EO tunable layer between the parallel reflection plates comprising LiNbO3. In another preferred embodiment, the EO tunable layer between the parallel reflection plates comprising a semiconductor. In another preferred embodiment, the EO tunable layer between the parallel reflection plates comprising an electro-optical polymer. In another preferred embodiment, the EO tunable layer between the parallel reflection plates comprising a PLZT. In another preferred embodiment, the EO tunable layer between the parallel reflection plates comprising a KTN (KTaNbO3).

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is functional block diagram for a tunable single frequency fiber ring laser disclosed in a co-pending Patent Application implementing a mode selection tunable filter;

FIGS. 2A to 2C illustrate three alternate fast frequency selective switches;

FIG. 3 shows a diagram of the variation of the refractive index as function of applied voltage;

FIG. 4 is a diagram for showing the wavelength tuning for 2 mm cavity filled with a five micron EO polymer with R-0.995;

FIG. 5 is a diagram showing wavelength tuning for a 20 micron EO polymer filled cavity with R=0.9;

FIG. 6 shows a polymer filled optical tunable filter;

FIGS. 8A and 8B are cross sectional views of the structures for EO polymer tunable filter;

FIG. 9 is a functional block diagram for showing a tunable fiber laser provided for locking the frequency and stabilizing the power;

FIG. 10 is a flowchart for showing the tuning and locking algorithm for a tunable fiber laser of this invention;

FIG. 11 shows a transmission curve of an etalon for tuning and locking the frequency of the tunable fiber laser;

FIG. 12 is a diagram for showing a typical responsivity of InGaAs photodetector; and FIG. 13 is a schematic diagram for showing an integrated solution for providing components used in the tunable fiber laser.

DETAILED DESCRIPTION OF THE INVENTION

Figure 7A:
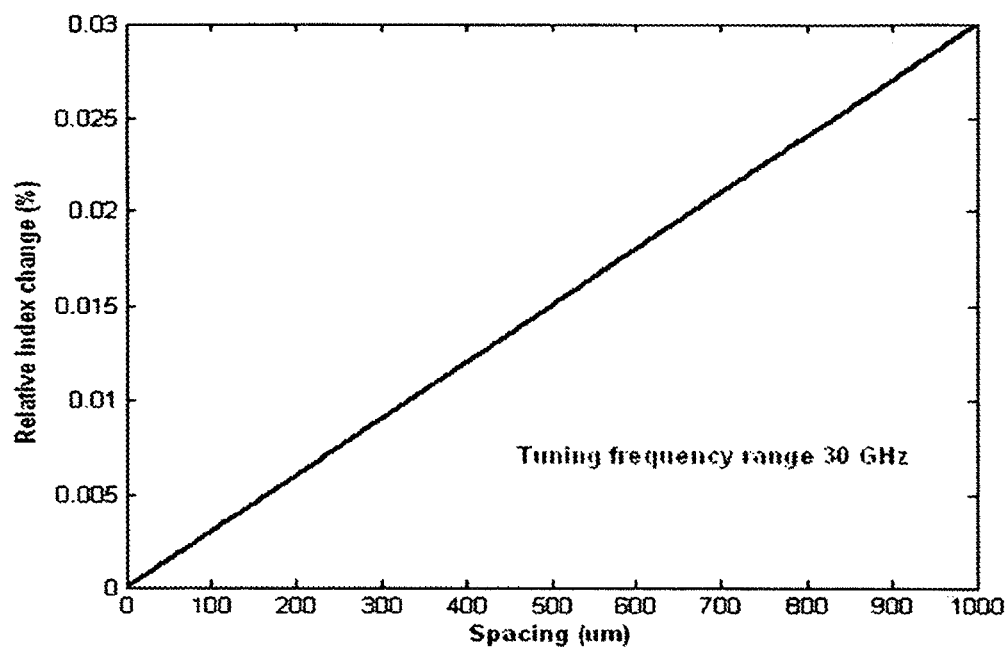
FIGS. 7A and 7B show the relative index change and applied voltage versus spacing for a 30 GHz frequency shift.

Referring to FIG. 1 for a tunable single frequency fiber ring laser 100 implemented with a mode selection tunable filter 140 to select the lasing mode wherein an electrical optical (EO) polymer is used in the filter to change the phase of the filter at fast speed and high accuracy. FIG. 1 shows a single frequency fiber ring laser 100 as a unidirectional cavity. The ring laser 100 includes a 980/1480 nm laser pump 110 to transmit a laser through a WDM 125 to a gain medium PM erbium doped fiber (EDF) 130. The laser then projects through a first isolator 135 to a mode selection filter 140 to select a single mode operation. The coupler 145 is for outputting a laser output 160 at a pre-selected ratio. One or two isolators, e.g., a second isolator 155 are used to assure the uni-direction operation.

Referring to FIG. 2A for an exemplary embodiment of the mode selection tunable filter 140 implemented as a fast wavelength selective switch. The fast wavelength selective switch includes a layer of EO material 170 is sand witched between two parallel plates with high reflectance 180. The EO material layer 170 can be inserted as shown in FIG. 2A or attached/integrated as that shown in FIGS. 2B and 2C with the two plates 180. Electrodes layer 175 has to be transparent to the operating wavelength range. This configuration takes advantage of the FP cavity and the fast response nature of EO material to achieve fast wavelength selective switches.

The EO materials used to fabricate the wavelength selective switches 140 could be LiNbO3 or semiconductor or EO polymers or PLZT. An electrical optical (EO) polymer is a good candidate because it provides with large EO coefficient and easy fabrication process. It can be tuned at very high speed (110 GHz modulator has been demonstrated, ref. 4). The γ33 value of an EO material is an important parameter for EO modulators. The index modulation can be represented as:

$$\Delta n = \frac{1}{2}\gamma_{33}n_0^3 \frac{V'}{d'}$$

where V is the applied voltage. Table 1 shows some EO material characters. The EO polymers have large γ33 values (>40 pm/V) and no constraints due to lattice match with the substrate and are widely used for high speed and low driving voltage optical modulator.

TABLE 1

A survey of EO materials

| Name | γ(pm/V) | λ(nm) | n |
|---|---|---|---|
| LiN$_b$O$_3$ | 28.8 | 1300 | 2.14 |
| KN$_b$O$_3$ | 34 | 1300 | 2.12 |
| GaAs | 1.2 | 1020 | 3.50 |
| FTC/PMMA | 83 | 1300 | 1.65 |
| DRI/PMMA | 22 | 1300 | 1.58 |

To achieve fast continuous wavelength tuning and narrow linewidth single mode operation, the FP cavity of the mode selection has to be designed with a large spacing and high reflectance. A band pass filter has to be used to reject repeated modes unwanted from the FP cavity. It is an option to coat the surfaces of the FP cavity with band selective coating. FIG. 3 shows simulation results for index change as a function of applied voltage for EO polymer material under various thicknesses. It is easy to understand from the equation listed above that thinner layer of EO polymer requires less voltage applied to obtain a given index change. A co-pending patent application Ser. No. 10/337,081 discloses several examples on tuning wavelength over a wide range. In addition to achieve fine tuning with a narrow band with the bandwidth controlled by the bandpass filter as shown in FIG. 1, FIG. 4 provide an example of wavelength tuning by changing the refractive index of the cavity space as shown in FIG. 2C. The cavity is spaced at a distance of 2 millimeters with a polymer layer of thickness 5 micrometers. An index change of approximately 1.5% can cause >30 GHz wavelength tuning range and achieving nano second (ns) switching time with 5 micron thick cavity. The performance ensures that single frequency operation is achieved while tuning for a fiber laser cavity with a couple of meters length.

The system configuration and tuning techniques can be applied to linear configuration of fiber laser as well. The gain medium can be any rare earth doped or semiconductor based, such as erbium-doped fiber (1550 nm range), Tm doped fiber, Tellurite fiber, Yb doped fiber (1064 nm range), Er/Yb doped fiber, semiconductor amplifier. It can be single mode fiber, and double cladding fiber.

Furthermore, if the band pass filter can be tuned across the whole bandwidth of the gain medium, by combining with the continuous tuning of the mode selection tunable filter the laser can be tuned continuously across the whole bandwidth at single frequency operation. The tunable band pass filter 150 can be provided with a bandwidth large enough to cover the tuning bandwidth of mode selection tunable filter 140 and narrow enough to reject other modes of the mode selection tunable filter. The disclosures for some of the embodiments that cover the scopes have already bee described in the co-pending patent application Ser. No. 10/337,081, therefore the details will not be repeated here.

By employing the polymer based FP cavity as that shown in FIGS. 2A to 2C, fast tuning can be achieved. A cavity of 20 micrometers can be used to tune the central wavelength by changing the refractive index. A change of the refractive index by 1.5% can cause a central wavelength change of more than 30 nanometers. The reflectance is 90% and the bandwidth is 100 GHz, which is matched with the FSR of the mode selection tunable filter. By combining the two filters, wide range tuning can be achieved while maintaining single frequency operation of the fiber laser. FIG. 5 shows the tuning function while changing the index of refraction of the EO polymer.

FIG. 6 shows an alternate preferred embodiment that has a different configuration to implement the tunable polymer optical filter 140'. The electrodes 175' applied to the polymer material 170' are transverse to instead of perpendicular to the light propagation direction. The polymer can be EO or TO polymers. Other material having similar EO or TO properties may also apply to this invention. The positions of the polymer cells can be in the middle, filled in the FP cavity, or on one side of the cavity.

For the purpose of further improving the performance of the single frequency laser, the tuning speed of the mode selection tunable filter 140 is improved by optimizing the driving voltage applied to the EO polymer layer in the FP cavity. It is known that the speed of the frequency tuning is mainly limited by the spacing of the FP cavity and that is corresponding to the voltage applied to the cavity. To further increase the speed of the tuning, the voltage tuning range is reduced from a few hundreds of volts to a range that is below a couple of hundreds volts, a more controllable range. Since the voltage applied to the polymer is to change the refractive index by EO effects, the index change is proportional to the voltage applied and inversely proportional to the spacing or thickness of the polymer layer. With these functional relationships, in order to obtain same amount change of the refractive index and reduce the applied voltage, the spacing of the polymer layer for the FP cavity must be reduced.

When the spacing is reduced, the bandwidth of the FP cavity is also changed thus affecting the mode selection of the fiber laser. Further studies are performed of the variations of the bandwidth of the FP cavity as a function of cavity spacing and the reflectance of the two parallel surfaces. It is confirmed that for cavity filter with shorter spacing, the bandwidth can be kept unchanged by employing cavity plates with higher reflectance. A 99.99% reflectance is practically achievable, e.g., the market available reflecting plates by Forrealspectrum, Inc., provide such reflectance. Specifically, analyses predict that cavity spacing below 50 micrometers is possible to achieve a bandwidth as narrow as few hundreds of MHz by employing plates of high reflectance.

Figure 7B:
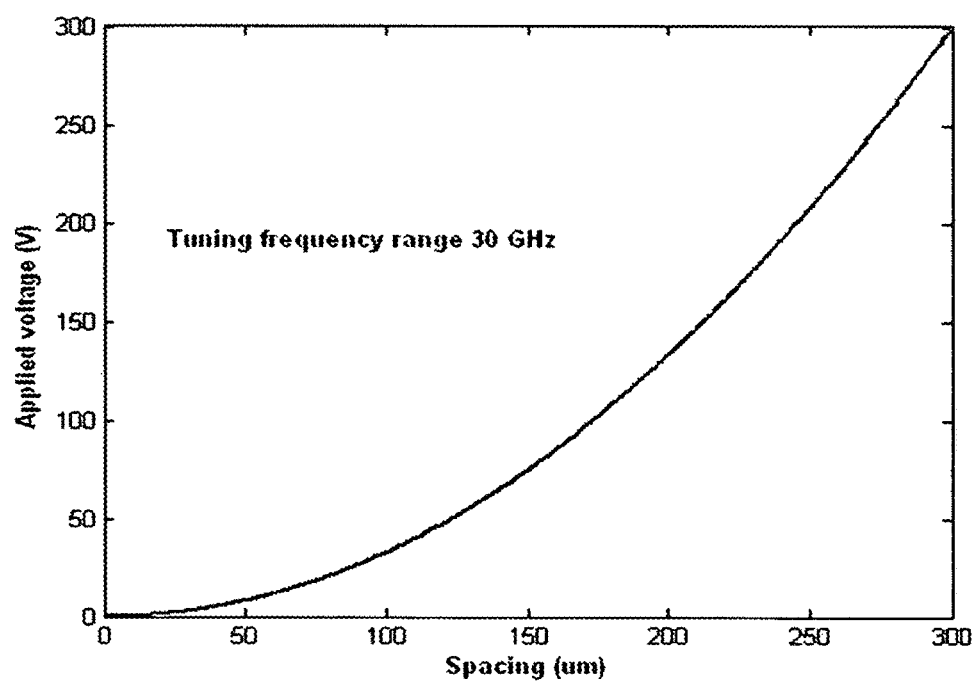

For the purpose of achieving 30 GHz tuning range of frequency, further studies are conducted by changing the relative index of a polymer tunable filter with various sizes of cavity spacing. FIGS. 7A and 7B show the changes of the relative index and the applied voltage respectively as a function of cavity spacing for a 30 GHz frequency shift. It shows that cavity of smaller spacing needs less index change and correspondingly less applied voltage to stimulate the change. By providing high reflectance FP cavity, it will be possible to achieve faster tuning speed with low driving voltage, e.g., a driving voltage below a couple of hundreds of volts.

FIGS. 8A and 8B show two types of filter structures considered in optimization of the performance of the tunable filter 200. The difference between these two structures shown in FIGS. 8A and 8B is the position of electrodes and high reflection coating in the cavity. In FIG. 6A, the electrodes 210, such as ITO and gold, are coated on glass substrate 220 first. Then multi layers high reflection coatings 230, with reflectance over 99%, are deposited on top of the electrodes 210. A spacer 240 with precise control of the parallel of the two high reflection surfaces (not shown) is put in between to form a FP cavity. The high reflection coating 230 in FIG. 8B is coated directly onto the glass substrate 220 and disposed between the glass substrate 220 and the electrodes 210. The EO polymer 250 can be inserted in two ways. The first method includes a step to first spin-coat the polymer 250 on one of the reflection surface 240. Then, applying a step by poling of the polymer followed by forming the FP cavity by using a precise spacer 240. The other method includes a step by forming the cavity first, then followed by injecting the polymer 250 in the cavity and uses the electrodes 210 to carry out the poling. The second method is preferred because it provides a more practical way of manufacturing.

Tuning and locking mechanism is important to both power and frequency stability of the tunable fiber-laser over a wide range of temperature and long-term reliable operations. Specifically, when the tunable fiber laser operates at a given frequency, it is important to be stable over a wide range of temperature and have long-term frequency and power stability. FIG. 9 shows a configuration to provide an efficient way of locking the lasing frequency and stabilizing the output power by using an etalon with a free spectral range of 80-100 GHz. The tunable fiber laser system 300 includes a tap coupler 310 coupled to an output fiber 305 to tap a little portion, e.g., 10% from the output port. The tapped optical signals are then splitted into two paths via a splitter 320. One of the paths 330 feeds into a detector 335 to measure a reference signal. Another path 340 transmits an optical signal to a second detector 345 through an etalon 350. A comparator 360 is then employed to compare the signal differences between the reference signals with that from etalon. An electronic controller 370 applies the frequency shift to adjust the mode selection tunable filter 140 as shown in FIG. 1. The reference signals are also fed back for adjustments to improve power stability by adjusting the pump diode to suppress the power fluctuations and reduce the RIN.

FIG. 10 shows the tuning and locking process to generate stable frequency and power from the fiber laser configured as that shown in FIG. 9. The process begins with a step of receiving a frequency-tuning signal (step 400) and using the frequency-tuning signal to generate a voltage to apply to the filter (step 410). A small portion of the output signal is tapped and splitted into a reference signal (step 420) and to pass through an etalon (step 430). The reference signal and the signal passing through the etalon are compared (step 440) to determine a frequency shift (step 450). Based on the frequency shift it is determined if the frequency stability criterion is satisfied, and a frequency tuning signal is generated (step 400) and the processes by applying steps 410 to step 450 are repeated. In the meantime, the reference signal is inputted to a power stability detection circuit to determine if a power stability criterion is satisfied (step 460). A pump diode current is adjusted (step 470) to adjust the laser power if it is determined from the reference signal that it is required to reduce the power fluctuations.

For the purpose of providing improved control over frequency stability, the etalon 350 implemented for tuning and locking as described above must have low reflectance, e.g., 60%-80% or low finesse in order to provide sufficient sensitivity to the slope of the transmission curve to differentiate the frequency shift below 100 MHz. FIG. 11 is a diagram for showing an example of such transmission curve of the etalon. It clearly shows that 30 GHz range of frequency shift can be generated with about 80% of the power change from the etalon. For 100 MHz control accuracy, 0.2% power change detection is required. Assuming 10% of 100 mW output is taped out for monitoring and control, the power change corresponding to 0.2% will be 0.2%×100×50%=0.1 mW. Based on the responsivity a s that shown in FIG. 12, this converts to 0.1 mA current change approximately. It is easily detectable and controllable by using a commercially available detector, e.g., a detector provided by Fermionics Opto-Technology.

FIG. 13 shows an integrated module that includes all passive components as described above to an integrated and compact package. This compact module 500 for implementing with the fiber lasers includes a WDM coupler (not shown) coupled to a dual-core collimator 510 that includes a pump reflection coating 515. The module further includes a polymer based tunable FP filter 520 attached with a narrow bandpass filter 530. Toward the output end, a free space isolator 540 disposed immediately next to a reflection output coupler coating 550 attached to an output dual core collimator 560. By employing the integrated solution as shown in FIG. 13, the gain fiber can be spliced into the module directly without any difficulty. This in turn enable those of ordinary skill in the art to make the fiber laser ring cavity in a reasonably short length to increase the mode spacing for ease of selecting narrow bandpass filters.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. A laser device, comprising:
a laser gain medium configured to produce a first laser beam;
a mode-selection filter configured to receive the first laser beam and to produce a second laser beam that comprises a plurality of spectral peaks having first line widths, wherein two of the plurality of spectral peaks are separated by a frequency difference, wherein the mode-selection filter comprises:
a first reflective plate configured to receive the first laser beam orthogonal to the first reflective plate;
a second reflective plate parallel to the first reflective plate; and
an optical material disposed between the first parallel reflective plate and the second reflective plate wherein the optical material is an electro-optical material selected from a group consisting of $LiNbO_3$, a semiconductor material, a PLZT, KTN ($KTaNbO_3$) and an electro-optical polymer, and configured to shift frequencies of the plurality of spectral peaks in response to an electric field; and wherein the first reflective plate, the optical material, and the second reflective plate are configured to filter the first laser beam to produce the second laser beam exiting the second reflection plate;
a band-pass filter configured to filter the second laser beam and to produce a third laser beam having one of the plurality of spectral peaks;
an optical sensor configured to output an output sensing signal in response to the third laser beam; and a controller configured to control the mode-selection filter in response to the output sensing signal to reduce fluctuations in power, frequency, or a combination thereof in the third laser beam.

2. The laser device of claim 1, wherein the laser gain medium is configured to produce the first laser beam in response to a pump laser beam.

3. The laser device of claim 1, wherein the controller is configured to control the electrode in the mode-selection filter in response to the output sensing signal to reduce fluctuations in power, frequency, or a combination thereof in the third laser beam.

4. The laser device of claim 1, wherein the electric field is substantially perpendicular to the first laser beam or the second laser beam.

5. The laser device of claim 1, wherein the electric field is substantially parallel to the first laser beam or the second laser beam.

6. The laser device of claim 1, wherein the electro-optical material is configured to vary the first wavelength by more than 40 pm for each voltage produced by the electric field applied across the electro-optical material.

7. The laser device of claim 1, wherein the electro-optical material is configured to vary the one of the plurality of transmission peaks by more than 20 GHz in response to the electric field.

8. The laser device of claim 1, wherein the third laser beam has a line width narrower than 150 GHz.

9. The laser device of claim 1, wherein the laser gain medium, the mode-selection filter, and the band-pass filter in part form a ring-shaped laser resonance cavity.

10. The laser device of claim 1, wherein the band-pass filter has a second bandwidth wider than the first bandwidth but narrower than the frequency difference.

11. A laser device, comprising:
a laser gain medium configured to produce a first laser beam;
a mode-selection filter comprising:
  a first reflective plate configured to receive the first laser beam orthogonal to the first reflective plate;
  a second reflective plate parallel to the first reflective plate; and
  an electro-optical material disposed between the first parallel reflective plate and the second reflective plate, wherein the mode-selection filter is configured to filter the first laser beam to produce a second laser beam exiting the second reflection plate, wherein the second laser beam comprises at least two spectral peaks separated by a frequency difference and having first line widths, and wherein the electro-optical material is selected from a group consisting of $LiNbO_3$, a semiconductor material, a PLZT, KTN ($KTaNbO_3$), and an electro-optical polymer and is configured to shift frequencies of the two spectral peaks in response to an electric field; and
a band-pass filter configured to filter the second laser beam and to produce a third laser beam having one of the two spectral peaks, wherein the band-pass filter has a second bandwidth wider than the first bandwidth but narrower than the frequency difference.

12. The laser device of claim 11, wherein the first reflective plate and the second reflective plate are positioned substantially orthogonal to the first laser beam and the second laser beam.

13. The laser device of claim 11, wherein the electro-optical material is configured to vary the first wavelength by more than 40 pm for each voltage produced by the electric field applied across the electro-optical material.

14. The laser device of claim 11, wherein the electro-optical material is configured to vary at least the two transmission peaks by more than 20 GHz in response to the electric field.

15. The laser device of claim 11, wherein the third laser beam has a line width narrower than 150 GHz.

16. A laser device, comprising:
a laser gain medium selected from a group consisting of an erbium doped fiber (EDF), a rare earth doped fiber, a Tm doped fiber, a Telluride doped fiber, a Yb doped fiber, and an Er/Yb doped fiber and configured to produce a first laser beam;
a mode-selection filter configured to filter the first laser beam to produce a second laser beam, wherein the mode-selection filter has a transmission spectrum that includes a plurality of transmission peaks, wherein one of the plurality of transmission peaks has a first bandwidth at a first wavelength and is separated from one of its adjacent transmission peaks by a frequency difference, wherein the transmission spectrum of the mode-selection filter is tunable by an electric field, wherein the electric field is configured to vary the first wavelength at which the one of the plurality of transmission peaks is located; and
a band-pass filter configured to filter the second laser beam and to produce a third laser beam, wherein the band-pass filter has a second bandwidth wider than the first bandwidth but narrower than the frequency difference, wherein the band-pass filter is configured to pass the one of the plurality of transmission peaks at the first wavelength while filtering out other transmission peaks in the plurality of transmission peaks in the second laser beam, wherein the laser gain medium, the mode-selection filter, and the band pass filter in part form a laser resonance cavity in the laser device.

17. The laser device of claim 16, wherein the laser gain medium is configured to produce the first laser beam in response to the pump laser beam.

18. The laser device of claim 16, wherein the third laser beam has a line width narrower than 150 GHz.

* * * * *